US012248274B2

(12) United States Patent
Yamada et al.

(10) Patent No.: US 12,248,274 B2
(45) Date of Patent: Mar. 11, 2025

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Motoya Yamada, Chiba (JP); Koji Takahashi, Chiba (JP); Masayuki Shinozuka, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 541 days.

(21) Appl. No.: 17/651,637

(22) Filed: Feb. 18, 2022

(65) Prior Publication Data

US 2022/0276578 A1 Sep. 1, 2022

(30) Foreign Application Priority Data

Feb. 26, 2021 (JP) ................................ 2021-031219

(51) Int. Cl.
*G03G 5/10* (2006.01)
*G03G 21/18* (2006.01)

(52) U.S. Cl.
CPC ......... *G03G 5/102* (2013.01); *G03G 21/1814* (2013.01)

(58) Field of Classification Search
CPC .... G03G 5/102; G03G 21/1814; G03G 15/75; G03G 5/0436; G03G 5/0507
See application file for complete search history.

(56) References Cited

U.S. PATENT DOCUMENTS 4,686,165 A 8/1987 Suda
8,457,528 B2 6/2013 Ochi et al.
8,865,380 B2 10/2014 Noguchi et al.
9,114,565 B2 8/2015 Kawai et al.
(Continued)

FOREIGN PATENT DOCUMENTS

JP 2009-150958 A 7/2009
JP 2017-111409 A 6/2017
WO 2019/077705 A1 4/2019

OTHER PUBLICATIONS

U.S. Appl. No. 17/649,570, Masayuki Shinozuka, filed Feb. 1, 2022.
(Continued)

*Primary Examiner* — Stewart A Fraser
(74) *Attorney, Agent, or Firm* — VENABLE LLP

(57) ABSTRACT

Provided is an electrophotographic photosensitive member that can suppress the surface direction unevenness of an output image throughout repeated image formation. The electrophotographic photosensitive member is an electrophotographic photosensitive member including a support having a cylindrical shape and a photosensitive layer formed on the support, wherein the support contains at least one of aluminum or an aluminum alloy, and wherein when an area at the maximum frequency calculated from the area distribution curve of the aluminum crystal grains of the surface of the support is represented by A ($\mu m^2$) and the half-width of the highest peak in the area distribution curve is represented by B ($\mu m^2$), the support satisfies the following formula (1):

$$B/A \leq 1.0 \quad (1).$$

8 Claims, 2 Drawing Sheets

(56) References Cited

U.S. PATENT DOCUMENTS

| | | | | |
|---|---|---|---|---|
| 9,389,521 | B2 | 7/2016 | Takahashi et al. | |
| 9,766,561 | B2 | 9/2017 | Takahashi et al. | |
| 9,772,596 | B2 | 9/2017 | Mitsui | |
| 10,042,273 | B2 | 8/2018 | Takahashi et al. | |
| 10,429,754 | B2 | 10/2019 | Takahashi et al. | |
| 10,558,132 | B2 | 2/2020 | Ishiduka et al. | |
| 11,112,707 | B2 | 9/2021 | Takahashi et al. | |
| 2002/0039697 | A1 | 4/2002 | Kojima | |
| 2006/0194132 | A1 | 8/2006 | Hosoi et al. | |
| 2014/0045109 | A1* | 2/2014 | Yamashita | G03G 5/04 399/111 |
| 2014/0045110 | A1* | 2/2014 | Matsuki | G03G 5/0542 430/69 |
| 2014/0093281 | A1 | 4/2014 | Takahashi et al. | |
| 2016/0223925 | A1 | 8/2016 | Tamemasa | |
| 2019/0384191 | A1 | 12/2019 | Kobayashi | |
| 2021/0302849 | A1 | 9/2021 | Takahashi | |

OTHER PUBLICATIONS

U.S. Appl. No. 17/650,991, Koji Takahashi, filed Feb. 14, 2022.

3003 (AlMn1Cu, 3.0517, A93003) Aluminum, MakeItFrom.com, pp. 1-5.

ASM Aerospace Specification Metals Inc., ASM Material Data Sheet, Aluminum 6063-O, pp. 1-2.

* cited by examiner

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present invention relates to an electrophotographic photosensitive member, and to a process cartridge and an electrophotographic apparatus each including the electrophotographic photosensitive member.

Description of the Related Art

In recent years, the diversification of the users of an electrophotographic apparatus has been advancing, and hence there has been a growing need for an image to be output to have quality higher than a conventional one. In International Publication No. WO2019/077705, as a technology concerning an improvement in image quality, there is a description of a technology including setting the stress value of a conductive support within the range of from −30 MPa or more to 5 MPa or less. In Japanese Patent Application Laid-Open No. 2009-150958, as a technology of improving image quality from the viewpoint of accuracy, there is a description of a technology including heating an element tube made of an aluminum alloy at from 190° C. to 550° C. before its cutting. In addition, in Japanese Patent Application Laid-Open No. 2017-111409, there is a description of a technology including setting the average area of the crystal grains of an aluminum alloy having specific composition to 3 $\mu m^2$ or more and 100 $\mu m^2$ or less.

SUMMARY OF THE INVENTION

According to an investigation by the inventors of the present invention, an electrophotographic photosensitive member described in International Publication No. WO2019/077705, Japanese Patent Application Laid-Open No. 2009-150958, or Japanese Patent Application Laid-Open No. 2017-111409 has involved a problem in that, when image formation is repeatedly performed, surface direction unevenness is liable to occur in an output image. Accordingly, an object of the present invention is to provide an electrophotographic photosensitive member that can suppress the surface direction unevenness of an output image throughout repeated image formation.

The object is achieved by the present invention described below. That is, an electrophotographic photosensitive member according to the present invention is an electrophotographic photosensitive member including: a support having a cylindrical shape; and a photosensitive layer formed on the support, wherein the support contains at least one of aluminum or an aluminum alloy, and wherein when an area at a maximum frequency calculated from an area distribution curve of aluminum crystal grains of a surface of the support is represented by A ($\mu m^2$) and a half-width of a highest peak in the area distribution curve is represented by B ($\mu m^2$), the support satisfies the following formula (1).

$$B/A \leq 1.0 \quad (1)$$

The electrophotographic photosensitive member that can suppress the surface direction unevenness of an output image throughout repeated image formation can be provided.

Further features of the present invention will become apparent from the following description of exemplary embodiments with reference to the attached drawings.

DESCRIPTION OF THE EMBODIMENTS

Figure 1A:
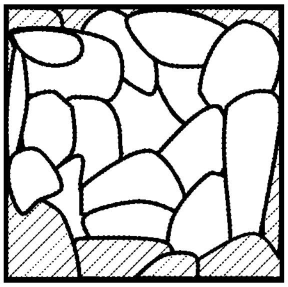
FIG. 1A is a schematic view of an observation screen at the time of the observation of the surface of the support of an electrophotographic photosensitive member of the present invention with an electron microscope.

The present invention is described in detail below by way of an exemplary embodiment.

The inventors of the present invention have made an investigation, and as a result, have found that in a related-art electrophotographic photosensitive member, when image formation is repeatedly performed, slight variation in potential of the exposed portion of the photosensitive member is caused by the minute resistance unevenness of the conductive aluminum-made support thereof itself, and surface direction unevenness may occur in an output image because of the variation.

To solve the problem, the inventors of the present invention have investigated the crystal grains of the surface of the aluminum-made support.

As a result of the investigation, the inventors have found that in an electrophotographic photosensitive member including a support having a cylindrical shape and a photosensitive layer formed on the support, when the support contains at least one of aluminum or an aluminum alloy, and when an area at the maximum frequency calculated from the area distribution of the aluminum crystal grains of the surface of the support is represented by A ($\mu m^2$) and the half-width of the highest peak in the area distribution curve is represented by B ($\mu m^2$), the support satisfies the following formula (1), the surface direction curve unevenness of an output image that has occurred in the related-art electrophotographic photosensitive member can be reduced.

$$B/A \leq 1.0 \quad (1)$$

The inventors of the present invention have conceived the mechanism via which the surface direction unevenness of the output image can be reduced by the configuration of the present invention to be as described below.

The aluminum crystal grains typically have random sizes. The inventors of the present invention have assumed that the ease with which an electron flows in a crystal slightly varies depending on the sizes of the aluminum crystal grains, that is, the ease is affected by a grain boundary between the crystal grains to a larger extent as the crystal grains become smaller, and hence it becomes more difficult to flow an electron.

In the aluminum-made support to be used in the related-art electrophotographic photosensitive member, its aluminum crystal grains have random sizes. Accordingly, the crystal grains differ from each other in ease with which an electron flows. When image formation is repeatedly performed, the difference in ease with which an electron flows between the crystal grains becomes more remarkable to cause the surface direction unevenness of the potential of the photosensitive member. The image formation is performed in accordance with the potential, and hence the potential and the magnitude of the unevenness of the output image are in a proportional relationship. Probably as a result of the foregoing, the surface direction unevenness occurs in the output image.

Accordingly, it is assumed that when the sizes of the aluminum crystal grains for forming the surface of the aluminum-made support are brought close to a uniformized state, an electric current flowing through the aluminum-made support is uniformized to alleviate the potential unevenness, and hence the surface direction unevenness of the output image is reduced. The fact that the sizes of the aluminum crystal grains for forming the surface of the aluminum-made support are uniformized can be judged from the areas of the aluminum crystal grains.

When the respective configurations synergistically affect each other like the foregoing mechanism, the effect of the present invention can be achieved.

Electrophotographic Photosensitive Member

An electrophotographic photosensitive member of the present invention is characterized by including a support whose surface is formed of at least one of aluminum or an aluminum alloy, a charge-generating layer, and a charge-transporting layer. The film of aluminum hydroxide and/or aluminum oxide may be formed on the surface of the support.

An example of a method of producing the electrophotographic photosensitive member of the present invention is a method including: preparing coating liquids for the respective layers to be described later; applying the liquids in a desired layer order; and drying the liquids. In this case, examples of a method of applying each of the coating liquids include dip coating, spray coating, inkjet coating, roll coating, die coating, blade coating, curtain coating, wire bar coating, and ring coating. Of those, dip coating is preferred from the viewpoints of efficiency and productivity.

The support and the respective layers are described below.

<Support>

The electrophotographic photosensitive member of the present invention includes a support having a cylindrical shape, whose surface is formed of at least one of aluminum or an aluminum alloy. In addition, the surface of the support may be subjected to, for example, hot water treatment, blast treatment, or cutting treatment.

(1) With Regard to Area Distribution Curve of Crystal Grains

When the area of the aluminum crystal grains of the surface of the support at the maximum frequency calculated from the area distribution curve of the aluminum crystal grains is represented by A ($\mu m^2$), and the half-width of the highest peak in the area distribution curve of the aluminum crystal grains is represented by B ($\mu m^2$), the ratio B/A is 1.0 or less.

From the viewpoint of minimizing a difference in ease with which an electron flows between the crystal grains, the ratio B/A is preferably 0.7 or less. Further, when the ratio B/A is 0.5 or less, the effect of the present invention can be more satisfactorily obtained.

(2) With Regard to Average Area of Crystal Grains

The average area of the aluminum crystal grains is preferably 10 $\mu m^2$ or more. When the average area of the aluminum crystal grains is 10 $\mu m^2$ or more, the ease with which an electron flows is hardly affected by a grain boundary between the crystal grains, and hence initial charge retention can be suppressed from occurring on the support. As a result, short-term potential fluctuation can be reduced.

(Method of Measuring Areas of Crystal Grains)

The areas of the crystal grains may be measured, for example, as described below.

The areas of the crystal grains may be observed and measured with an electron microscope (e.g., a VE series manufactured by Keyence Corporation).

At 4 sites arranged every 90° in the circumferential direction of the photosensitive member at each of positions distant from both ends in the end portion axial direction of the photosensitive member by 40 mm each and a position in the center portion in the axial direction of the photosensitive member (a total of 4×3=12 sites), 10-millimeter square segments are cut out together with the support. When the length of the support is 297 mm, the end portions of the photosensitive member are specifically, for example, positions distant from both the ends in the axial direction of the photosensitive member by 40 mm, 18.5 mm, or 8.5 mm each.

The protective layer of each of the segments is removed by polishing the segment with a polishing sheet, and the photosensitive layer thereof is removed with methyl ethyl ketone. After that, the surface of the support is exposed and subjected to mirror finishing by buffing. Next, the segment is treated by being immersed in an aqueous solution of sodium hydroxide for 1 minute to provide a sample for measuring the areas of crystal grains.

A 100-micrometer square region of the surface of the sample is observed with the electron microscope, and the areas of its crystal grains are calculated with image processing software that the microscope comes standard with. The crystal grains of aluminum hydroxide and/or aluminum oxide are present on the surface of the sample, and hence the crystal grains to be observed may be these crystal grains. However, the film of aluminum hydroxide and/or aluminum oxide on the surface of the sample has so thin a thickness that at the time of the observation with the electron microscope, an electron beam penetrates the film to enable the observation of the aluminum crystal grains. Accordingly, in the present invention, the aluminum crystal grains include not only the crystal grains of aluminum but also the crystal grains of aluminum hydroxide and aluminum oxide.

At this time, with regard to crystal grains whose entire shapes are not seen in the observation screen of the microscope as illustrated by oblique lines in FIG. 1A, the crystal grains are manually excluded.

(Method of Producing Area Distribution Curve of Crystal Grains)

Figure 1B:
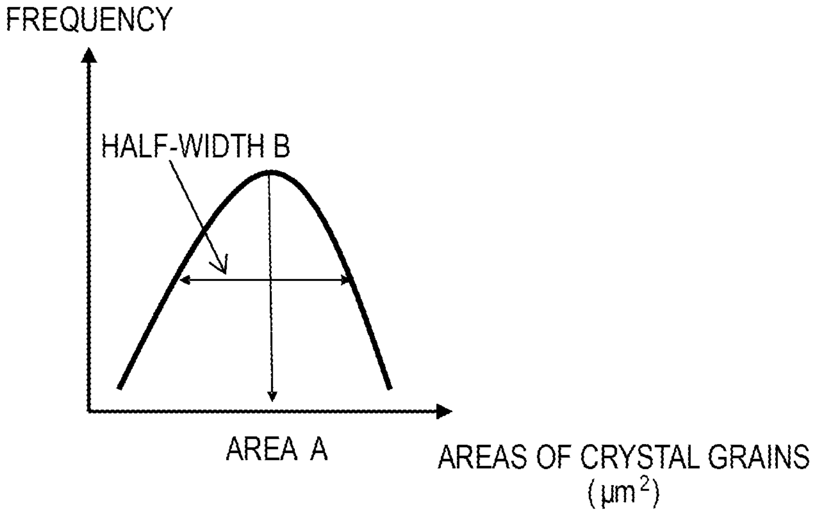
FIG. 1B is a graph for showing the area distribution of crystal grains.

First, the average area of the crystal grains observed in the samples obtained at the 12 sites obtained in the foregoing is calculated. The frequencies of the areas of the crystal grains are calculated in increments or decrements of 1/20 of the resultant average area, and the area distribution of the crystal grains is produced. Specifically, the frequencies of the areas of the crystal grains are calculated in the increments or the decrements from the average area. For example, when the average area is 50 $\mu m^2$, the frequencies of the areas of the crystal grains are calculated in 2.5 $\mu m^2$ increments or 2.5 $\mu m^2$ decrements from 50 $\mu m^2$. And an area distribution curve shown in FIG. 1B is produced. The area distribution curve shown in FIG. 1B is a normal distribution curve that best fits the frequencies of the areas. An area at the maximum frequency calculated from the area distribution curve was represented by A ($\mu m^2$), and the range (width of an axis of abscissa) of an area having a value equal to one half of the maximum frequency in the area distribution curve, that is, the half-width of the highest peak in the area distribution curve (the half-width of a peak top of the normal distribution curve) was represented by B ($\mu m^2$).

(3) With Regard to Aluminum Alloy

When the support contains the aluminum alloy, the aluminum alloy is preferably a 3000 series aluminum alloy or a 6000 series aluminum alloy. An example of the 3000 series aluminum alloy is a JIS 3003 alloy, specifically an aluminum alloy containing 0.6 mass % or less of a silicon element, 0.7 mass % or less of an iron element, 0.05 mass % or more and 0.2 mass % or less of a copper element, 1.0 mass % or more and 1.5 mass % or less of a manganese element, and 0.1 mass % or less of a zinc element, and containing aluminum and impurities as a balance. In addition, an example of the 6000 series aluminum alloy is a JIS 6063 alloy, specifically an aluminum alloy containing 0.2 mass % or more and 0.6 mass % or less of a silicon element, 0.35 mass % or less of an iron element, 0.1 mass % or less of a copper element, 0.1 mass % or less of a manganese element, 0.45 mass % or more and 0.9 mass % or less of a magnesium element, 0.1 mass % or less of a chromium element, 0.1 mass % or less of a zinc element, and 0.1 mass % or less of a titanium element, and containing aluminum and impurities as a balance. The aluminum alloy is preferably such 3000 series aluminum alloy or 6000 series aluminum alloy for controlling the crystal area distribution of the crystal grains.

(4) With Regard to Method of Producing Support

A method of producing the support is not particularly limited as long as the support to be produced satisfies the requirement of the present invention.

An example of the method of producing the support is a method including: a step of preparing aluminum or a specific aluminum alloy; a first step of subjecting the prepared aluminum or aluminum alloy to hot extrusion processing to provide a molded body; a second step of subjecting the molded body obtained in the first step to cold drawing; a third step of annealing the resultant after the second step; and a step of cutting the surface of the annealed product after the third step.

In the method, the areas of the crystal grains of the support can be controlled by a temperature increase time, a temperature, a maintenance time, and a cooling time in the annealing of the third step.

In particular, when the temperature of the annealing is set to from 405° C. to 450° C., the area distribution of the crystal grains can be narrowed. In addition, the areas of the crystal grains are changed by a temperature increase rate and a cooling rate, and hence it is preferred that the temperature increase rate be controlled to 40° C./min or less, and a temperature decrease rate be controlled to 5° C./min or less. The maintenance time is preferably set to 2 hours or more so that sufficient recrystallization may occur.

In addition, a thermal history is important at the time of the control of the areas of the crystal grains, and hence the support is preferably produced by annealing a product that has undergone the first step and the second step described above.

<Conductive Layer>

In the electrophotographic photosensitive member of the present invention, a conductive layer may be arranged on the support. The arrangement of the conductive layer can conceal flaws and irregularities in the surface of the support, and control the reflection of light on the surface of the support.

The conductive layer preferably contains conductive particles and a resin.

A material for the conductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, a metal oxide is preferably used as the conductive particles, and in particular, titanium oxide, tin oxide, and zinc oxide are more preferably used.

When the metal oxide is used as the conductive particles, the surface of the metal oxide may be treated with a silane coupling agent or the like, or the metal oxide may be doped with an element, such as phosphorus or aluminum, or an oxide thereof.

In addition, each of the conductive particles may be of a laminated construction having a core particle and a coating layer coating the particle. Examples of the core particle include titanium oxide, barium sulfate, and zinc oxide. The coating layer is, for example, a metal oxide, such as tin oxide.

In addition, when the metal oxide is used as the conductive particles, their volume-average particle diameter is preferably 1 nm or more and 500 nm or less, more preferably 3 nm or more and 400 nm or less.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the conductive layer may further contain a concealing agent, such as a silicone oil, resin particles, or titanium oxide.

The conductive layer has an average thickness of preferably 1 μm or more and 50 μm or less, particularly preferably 3 μm or more and 40 μm or less.

The conductive layer may be formed by preparing a coating liquid for a conductive layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. As a dispersion method for dispersing the conductive particles in the coating liquid for a conductive layer, there are given methods using a paint shaker, a sand mill, a ball mill, and a liquid collision-type high-speed disperser.

<Undercoat Layer>

In the electrophotographic photosensitive member of the present invention, an undercoat layer may be arranged on the support or the conductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron-transporting substance, a metal oxide, a metal, a conductive polymer, and the like for the purpose of improving electric characteristics. Of those, an electron-transporting substance and a metal oxide are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The undercoat layer has an average thickness of preferably 0.1 μm or more and 50 μm or less, more preferably 0.2 μm or more and 40 μm or less, particularly preferably 0.3 μm or more and 30 μm or less.

The undercoat layer may be formed by preparing a coating liquid for an undercoat layer containing the above-mentioned materials and a solvent, forming a coat thereof, and drying and/or curing the coat. Examples of the solvent to be used for the coating liquid include an alcohol-based solvent, a ketone-based solvent, an ether-based solvent, an ester-based solvent, and an aromatic hydrocarbon-based solvent.

<Photosensitive Layer>

In the electrophotographic photosensitive member of the present invention, the photosensitive layer may be mainly (1) a laminated photosensitive layer or (2) a single-layer photosensitive layer. (1) The laminated photosensitive layer has a charge-generating layer containing a charge-generating substance and a charge-transporting layer containing a charge-transporting substance. (2) The single-layer photosensitive layer has a photosensitive layer containing both a charge-generating substance and a charge-transporting substance.

(1) Laminated Photosensitive Layer

The laminated photosensitive layer includes the charge-generating layer and the charge-transporting layer.

(1-1) Charge-Generating Layer

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably 40 mass % or more and 85 mass % or less, more preferably 60 mass % or more and 80 mass % or less with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The charge-generating layer has an average thickness of preferably 0.1 μm or more and 1 μm or less, more preferably 0.15 μm or more and 0.4 μm or less.

The charge-generating layer may be formed by preparing a coating liquid for a charge-generating layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

(1-2) Charge-Transporting Layer

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge-transporting substance in the charge-transporting layer is preferably 25 mass % or more and 70 mass % or less, more preferably 30 mass % or more and 55 mass % or less with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

In addition, the charge-transporting layer may contain an additive, such as an antioxidant, a UV absorber, a plasticizer, a leveling agent, a lubricity-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The charge-transporting layer has an average thickness of 5 μm or more and 50 μm or less, more preferably 8 μm or more and 40 μm or less, particularly preferably 10 μm or more and 30 μm or less.

The charge-transporting layer may be formed by preparing a coating liquid for a charge-transporting layer containing the above-mentioned materials and a solvent, forming a coat thereof, and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

(2) Single-Layer Photosensitive Layer

The single-layer photosensitive layer may be formed by preparing a coating liquid for a photosensitive layer containing the charge-generating substance, the charge-transporting substance, a resin, and a solvent, forming a coat thereof, and drying the coat. Examples of the charge-generating substance, the charge-transporting substance, and the resin are the same as those of the materials in the section "(1) Laminated Photosensitive Layer."

<Protective Layer>

In the electrophotographic photosensitive member of the present invention, a protective layer may be arranged on the photosensitive layer. The arrangement of the protective layer can improve durability.

The protective layer preferably contains the conductive particles and/or the charge-transporting substance, and a resin.

Examples of the conductive particles include particles of metal oxides, such as titanium oxide, zinc oxide, tin oxide, and indium oxide.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protective layer may be formed as a cured film by polymerizing a composition containing a monomer having a polymerizable functional group. As a reaction in this case, there are given, for example, a thermal polymerization reaction, a photopolymerization reaction, and a radiation polymerization reaction. Examples of the polymerizable functional group of the monomer having a polymerizable functional group include an acrylic group and a methacrylic group. A material having a charge-transporting ability may be used as the monomer having a polymerizable functional group.

The protective layer may contain an additive, such as an antioxidant, a UV absorber, a plasticizer, a leveling agent, a lubricity-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The protective layer has an average thickness of preferably 0.5 μm or more and 10 μm or less, more preferably 1 μm or more and 7 μm or less.

The protective layer may be formed by preparing a coating liquid for a protective layer containing the above-mentioned materials and a solvent, forming a coat thereof, and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

[Process Cartridge and Electrophotographic Apparatus]

A process cartridge of the present invention is characterized in that the cartridge integrally supports the electrophotographic photosensitive member described above and at least one unit selected from the group consisting of: a charging unit; a developing unit; and a cleaning unit, and is removably mounted onto the main body of an electrophotographic apparatus.

In addition, an electrophotographic apparatus of the present invention is characterized by including the electrophotographic photosensitive member described above, and a charging unit, an exposing unit, a developing unit, and a transferring unit.

Figure 2:
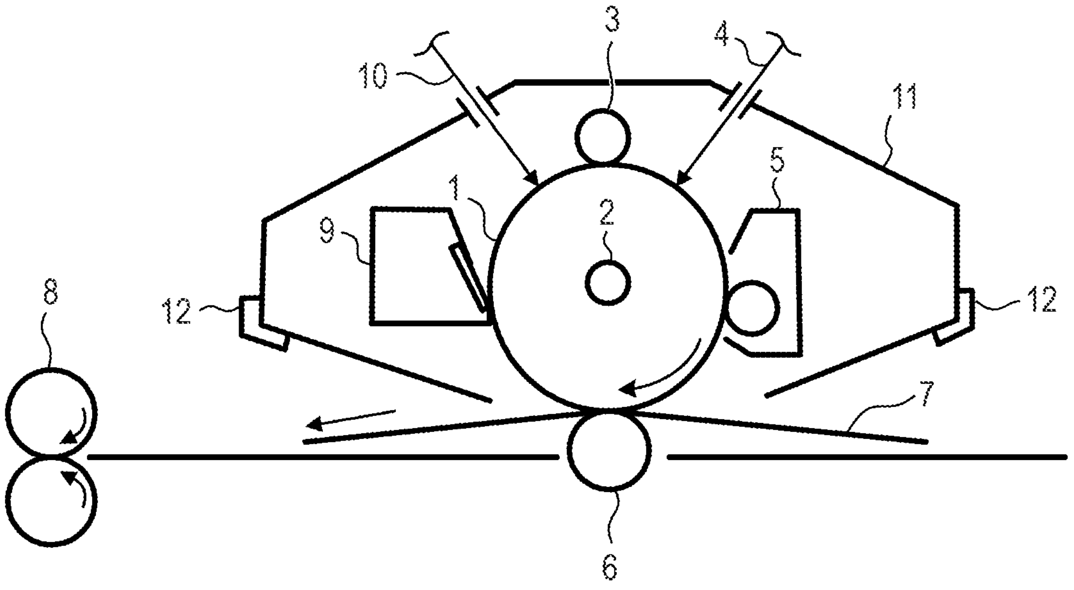
FIG. 2 is an illustration of an example of the schematic configuration of an electrophotographic apparatus of the present invention.

An example of the schematic construction of an electrophotographic apparatus including a process cartridge including an electrophotographic photosensitive member is illustrated in FIG. 2.

An electrophotographic photosensitive member 1 having a cylindrical shape is rotationally driven about a shaft 2 in a direction indicated by the arrow at a predetermined peripheral speed. The surface of the electrophotographic photosensitive member 1 is charged to a predetermined positive or negative potential by a charging unit 3. Although a roller charging system based on a roller-type charging member is illustrated in the figure, a charging system such as a corona charging system, a contact charging system, or an injection charging system may be adopted. The charged surface of the electrophotographic photosensitive member 1 is irradiated with exposure light 4 from an exposing unit (not shown), and hence an electrostatic latent image corresponding to target image information is formed thereon. The electrostatic latent image formed on the surface of the electrophotographic photosensitive member 1 is developed with a toner stored in a developing unit 5, and a toner image is formed on the surface of the electrophotographic photosensitive member 1. The toner image formed on the surface of the electrophotographic photosensitive member 1 is transferred onto a transfer material 7 by a transferring unit 6. The transfer material 7 onto which the toner image has been transferred is conveyed to a fixing unit 8, is subjected to treatment for fixing the toner image, and is printed out to the outside of the electrophotographic apparatus. The electrophotographic apparatus may include a cleaning unit 9 for removing a deposit, such as the toner remaining on the surface of the electrophotographic photosensitive member 1 after the transfer. In addition, a so-called cleaner-less system configured to remove the deposit with the developing unit or the like without separate arrangement of the cleaning unit may be used. The electrophotographic apparatus may include an electricity-removing mechanism configured to subject the surface of the electrophotographic photosensitive member 1 to electricity-removing treatment with pre-exposure light 10 from a pre-exposing unit (not shown). In addition, a guiding unit 12, such as a rail, may be arranged for removably mounting a process cartridge 11 of the present invention onto the main body of an electrophotographic apparatus.

The electrophotographic photosensitive member of the present invention can be used in, for example, a laser beam printer, an LED printer, a copying machine, a facsimile, and a multifunctional peripheral thereof.

EXAMPLES

The present invention is described in more detail below by way of Examples and Comparative Examples. The present invention is by no means limited to the following Examples, and various modifications may be made without departing from the gist of the present invention. In the description in the following Examples, "part(s)" is by mass unless otherwise specified.

[Method of Producing Support]

A support was produced by the following method.

Production Example of Support A-1

An extruded tube formed of a JIS 3003 alloy and subjected to hot extrusion molding was subjected to cold drawing processing to provide a drawn tube having an outer diameter of 30.8 mm, an inner diameter of 28.5 mm, and a length of 370 mm.

Next, the drawn tube was loaded into an electric furnace, and was annealed while its temperature was increased at a temperature increase rate of 5° C./min and was maintained at 450° C. for 2.5 hours. After that, the annealed product was cooled at 1° C./min, and 24 hours thereafter, the cooled product was removed from the furnace. Details are shown in Table 1.

The surface of the resultant was subjected to mirror cutting after the annealing. Thus, a support A-1 having an outer diameter of 30.5 mm, an inner diameter of 28.5 mm, and a length of 370 mm was obtained.

The elemental analysis of the used drawn tube showed that the tube was formed of an aluminum alloy containing 0.16 mass % of a silicon element, 0.2 mass % of an iron element, 0.08 mass % of a copper element, 1.3 mass % of a manganese element, and 0.02 mass % of a zinc element, and containing aluminum and impurities as a balance.

Production Examples of Supports A-2 to A-13

Supports were each produced in the same manner as in the production example of the support A-1 except that in the production example of the support A-1, the same drawn tube was used, and the annealing conditions were changed as shown in Table 1. The resultant supports are defined as a support A-2 to a support A-13.

Production Example of Support A-14

An extruded tube formed of a JIS 3003 alloy and subjected to hot extrusion molding was subjected to cold drawing processing to provide a drawn tube having an outer diameter of 30.8 mm, an inner diameter of 28.5 mm, and a length of 370 mm.

Next, the drawn tube was loaded into an electric furnace, and was annealed while its temperature was increased at a temperature increase rate of 5° C./min and was maintained at 435° C. for 2.5 hours. After that, the annealed product was cooled at 1° C./min, and 24 hours thereafter, the cooled product was removed from the furnace. Details are shown in Table 1.

The surface of the resultant was subjected to mirror cutting after the annealing. Thus, a support A-14 having an outer diameter of 30.5 mm, an inner diameter of 28.5 mm, and a length of 370 mm was obtained.

The elemental analysis of the used drawn tube showed that the tube was formed of an aluminum alloy containing 0.5 mass % of a silicon element, 0.6 mass % of an iron element, 0.15 mass % of a copper element, 1.2 mass % of a manganese element, and 0.08 mass % of a zinc element, and containing aluminum and impurities as a balance.

Production Example of Support B-1

An extruded tube formed of a JIS 6063 alloy and subjected to hot extrusion molding was subjected to cold drawing processing to provide a drawn tube having an outer diameter of 30.8 mm, an inner diameter of 28.5 mm, and a length of 370 mm.

Next, the drawn tube was loaded into an electric furnace, and was annealed while its temperature was increased at a temperature increase rate of 5° C./min and was maintained at 450° C. for 2.5 hours. After that, the annealed product was cooled at 1° C./min, and 24 hours thereafter, the cooled product was removed from the furnace. Details are shown in Table 1.

The surface of the resultant was subjected to mirror cutting after the annealing. Thus, a support B-1 having an outer diameter of 30.5 mm, an inner diameter of 28.5 mm, and a length of 370 mm was obtained.

The elemental analysis of the used drawn tube showed that the tube was formed of an aluminum alloy containing 0.5 mass % of a silicon element, 0.3 mass % of an iron element, 0.07 mass % of a copper element, 0.08 mass % of a manganese element, 0.7 mass % of a magnesium element, 0.04 mass % of a chromium element, 0.08 mass % of a zinc element, and 0.06 mass % of a titanium element, and containing aluminum and impurities as a balance.

Production Examples of Supports B-2 to B-13

Supports were each produced in the same manner as in the production example of the support B-1 except that in the production example of the support B-1, the same drawn tube was used, and the annealing conditions were changed as shown in Table 1. The resultant supports are defined as a support B-2 to a support B-13.

Production Examples of Support C-1 to Support C-11

Supports were each produced in the same manner as in the production example of the support A-1 except that in the production example of the support A-1, a drawn tube having an outer diameter of 30.8 mm, an inner diameter of 28.5 mm, and a length of 370 mm, which had been obtained by subjecting an extruded tube formed of a JIS 3003 alloy and subjected to hot extrusion molding to cold drawing processing, was used, and the annealing conditions were changed as shown in Table 1. The resultant supports are defined as a support C-1 to a support C-11.

Production Examples of Support C-12 and Support C-13

Annealing was performed by using drawn tubes each having an outer diameter of 30.8 mm, an inner diameter of 28.5 mm, and a length of 370 mm, the tubes each using an aluminum-magnesium (Al—Mg) alloy containing 2.5 mass % of a magnesium element, under conditions shown in Table 1. The surfaces of the resultant products were subjected to mirror cutting after the annealing. Thus, a support C-12 and a support C-13 each having an outer diameter of 30.5 mm, an inner diameter of 28.5 mm, and a length of 370 mm were obtained.

Production Examples of Support D-1 to Support D-11

Supports were each produced in the same manner as in the production example of the support B-1 except that in the production example of the support B-1, a drawn tube having an outer diameter of 30.8 mm, an inner diameter of 28.5 mm, and a length of 370 mm, which had been obtained by subjecting an extruded tube formed of a JIS 6063 alloy and subjected to hot extrusion molding to cold drawing processing, was used, and the annealing conditions were changed as shown in Table 1. The resultant supports are defined as a support D-1 to a support D-11.

TABLE 1

| | | Annealing condition | | | |
|---|---|---|---|---|---|
| Support | Aluminum alloy | Temperature increase rate [° C./min] | Annealing temperature [° C.] | Maintenance time [h] | Temperature decrease rate [° C./min] |
| Support A-1 | 3003 | 5 | 450 | 2.5 | 1 |
| Support A-2 | 3003 | 10 | 435 | 2.5 | 1 |
| Support A-3 | 3003 | 40 | 435 | 2 | 1 |
| Support A-4 | 3003 | 5 | 435 | 2.5 | 2 |
| Support A-5 | 3003 | 15 | 435 | 2.5 | 2 |
| Support A-6 | 3003 | 40 | 435 | 2 | 2 |
| Support A-7 | 3003 | 5 | 450 | 2.3 | 3 |
| Support A-8 | 3003 | 10 | 435 | 2 | 3 |
| Support A-9 | 3003 | 40 | 435 | 2 | 3 |
| Support A-10 | 3003 | 5 | 435 | 2 | 4 |
| Support A-11 | 3003 | 15 | 435 | 2.5 | 4 |
| Support A-12 | 3003 | 40 | 435 | 2.5 | 4 |
| Support A-13 | 3003 | 5 | 405 | 5 | 1 |
| Support A-14 | 3003 | 5 | 435 | 2.5 | 1 |
| Support B-1 | 6063 | 5 | 450 | 2.5 | 1 |
| Support B-2 | 6063 | 10 | 435 | 2.5 | 1 |
| Support B-3 | 6063 | 40 | 435 | 2 | 1 |
| Support B-4 | 6063 | 5 | 435 | 2.5 | 2 |
| Support B-5 | 6063 | 15 | 435 | 2.5 | 2 |
| Support B-6 | 6063 | 40 | 435 | 2 | 2 |
| Support B-7 | 6063 | 5 | 450 | 2.3 | 3 |
| Support B-8 | 6063 | 10 | 435 | 2 | 3 |
| Support B-9 | 6063 | 40 | 435 | 2 | 3 |
| Support B-10 | 6063 | 5 | 435 | 2 | 4 |
| Support B-11 | 6063 | 15 | 435 | 2.5 | 4 |
| Support B-12 | 6063 | 40 | 435 | 2.5 | 4 |
| Support B-13 | 6063 | 5 | 405 | 5 | 1 |
| Support C-1 | 3003 | 5 | 360 | 2 | 1 |
| Support C-2 | 3003 | 5 | 360 | 2 | 5 |
| Support C-3 | 3003 | 5 | 550 | 2 | 5 |
| Support C-4 | 3003 | 5 | 250 | 4 | 5 |
| Support C-5 | 3003 | 5 | 400 | 2 | 5 |
| Support C-6 | 3003 | 5 | 220 | 1 | 5 |
| Support C-7 | 3003 | 5 | 210 | 0.5 | 5 |
| Support C-8 | 3003 | 5 | 200 | 2 | 5 |
| Support C-9 | 3003 | 5 | 300 | 2 | 5 |
| Support C-10 | 3003 | 5 | 200 | 2.5 | 1 |
| Support C-11 | 3003 | 5 | 550 | 2.5 | 1 |
| Support C-12 | Al—Mg alloy | 5 | 380 | 2 | 5 |
| Support C-13 | Al—Mg alloy | 5 | 420 | 2 | 5 |
| Support D-1 | 6063 | 5 | 360 | 2 | 1 |
| Support D-2 | 6063 | 5 | 360 | 2 | 5 |
| Support D-3 | 6063 | 5 | 550 | 2 | 5 |
| Support D-4 | 6063 | 5 | 250 | 4 | 5 |
| Support D-5 | 6063 | 5 | 400 | 2 | 5 |
| Support D-6 | 6063 | 5 | 220 | 1 | 5 |
| Support D-7 | 6063 | 5 | 210 | 0.5 | 5 |
| Support D-8 | 6063 | 5 | 200 | 2 | 5 |
| Support D-9 | 6063 | 5 | 300 | 2 | 5 |
| Support D-10 | 6063 | 5 | 200 | 2.5 | 1 |
| Support D-11 | 6063 | 5 | 550 | 2.5 | 1 |

<Production of Electrophotographic Photosensitive Member>

Production Example of Photosensitive Member A-1

The support A-1 was used as a support, and an undercoat layer, a charge-generating layer, a charge-transporting layer, and a protective layer were formed as described below.

<Formation of Undercoat Layer>

100 Parts of zinc oxide particles (specific surface area: 19 $m^2/g$, powder resistivity: $3.6\times10^6$ Ω·cm) serving as a metal oxide were stirred and mixed with 500 parts of toluene, and 0.8 part of N-2-(aminoethyl)-3-aminopropylmethyldimethoxysilane (product name: KBM-602, manufactured by Shin-Etsu Chemical Co., Ltd.) was added as a silane coupling agent to the mixture, followed by stirring for 6 hours. After that, toluene was evaporated under reduced pressure, and the residue was dried under heating at 130° C. for 6 hours to provide surface-treated zinc oxide particles.

Next, 15 parts of a butyral resin (product name: BM-1, manufactured by Sekisui Chemical Company, Limited) serving as a polyol resin and 15 parts of a blocked isocyanate (product name: Sumidur 3175, manufactured by Sumika Bayer Urethane Co., Ltd.) were dissolved in a mixed solution of 73.5 parts of methyl ethyl ketone and 73.5 parts of 1-butanol. 80.8 Parts of the surface-treated zinc oxide particles obtained in the foregoing and 0.8 part of 2,3,4-trihydroxybenzophenone (manufactured by Tokyo Chemical Industry Co., Ltd.) were added to the solution, and the mixture was subjected to dispersion with a sand mill apparatus using glass beads each having a diameter of 0.8 mm under an atmosphere at 23° C.±3° C. for 3 hours. After the dispersion, 0.01 part of a silicone oil (product name: SH28PA, manufactured by Dow Corning Toray Silicone Co., Ltd.) and 5.6 parts of crosslinked polymethyl methacrylate particles (product name: TECHPOLYMER SSX-102, manufactured by Sekisui Kasei Co., Ltd., average primary particle diameter: 2.5 μm) were added to the dispersed product, and the mixture was stirred to prepare a coating liquid for an undercoat layer.

The coating liquid for an undercoat layer was applied onto the support A-1 by dip coating, and the resultant coat was dried for 40 minutes at 160° C. to form an undercoat layer having a thickness of 18 μm.

<Formation of Charge-Generating Layer>

20 Parts of a hydroxygallium phthalocyanine crystal (charge-generating substance) of a crystal form having peaks at Bragg angles 2θ±0.2° of 7.4° and 28.2° in CuKα characteristic X-ray diffraction, 0.2 part of a calixarene compound represented by the following formula (A):

(A)

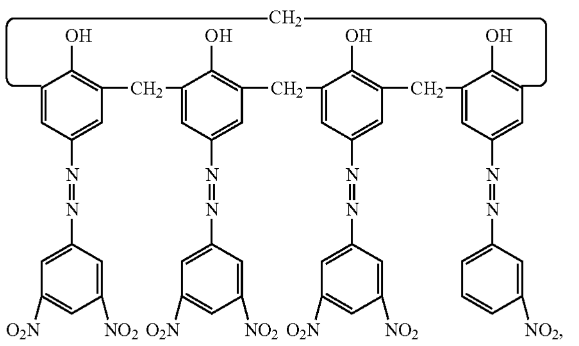

10 parts of polyvinyl butyral (product name: S-LEC BX-1, manufactured by Sekisui Chemical Company, Limited), and 600 parts of cyclohexanone were loaded into a sand mill using glass beads each having a diameter of 1 mm, and the mixture was subjected to dispersion treatment for 4 hours. After that, 700 parts of ethyl acetate was added to the dispersed product to prepare a coating liquid for a charge-generating layer. The coating liquid for a charge-generating layer was applied onto the undercoat layer by dip coating, and the resultant coat was dried for 15 minutes at 80° C. to form a charge-generating layer having a thickness of 0.17 μm.

<Formation of Charge-Transporting Layer>

30 Parts of a compound (charge-transporting substance) represented by the following formula (B), 60 parts of a compound (charge-transporting substance) represented by the following formula (C), 10 parts of a compound (charge-transporting substance) represented by the following formula (D):

(B)

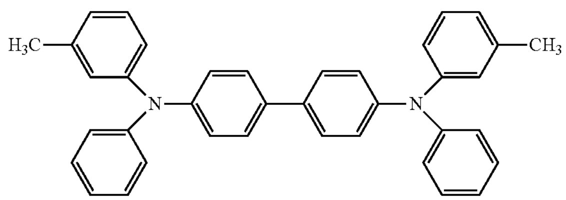

(C)

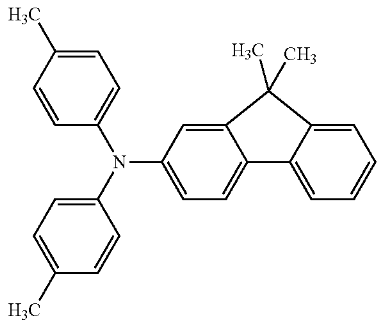

(D)

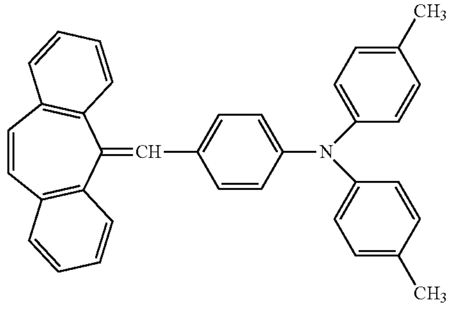

100 parts of a polycarbonate resin (product name: IUPILON Z400, manufactured by Mitsubishi Engineering-Plastics Corporation, bisphenol Z-type polycarbonate), and 0.02 part of polycarbonate represented by the following formula (E) (viscosity-average molecular weight Mv: 20,000):

(E)

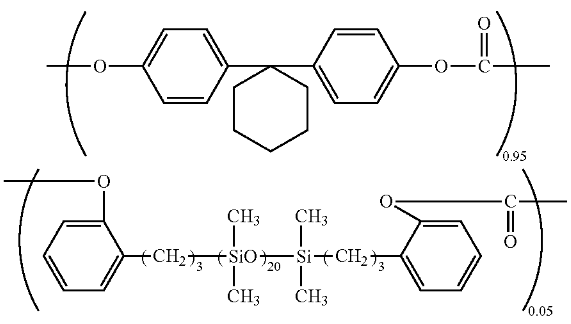

were dissolved in a mixed solvent of 600 parts of mixed xylene and 200 parts of dimethoxymethane to prepare a coating liquid for a charge-transporting layer. The coating liquid for a charge-transporting layer was applied onto the charge-generating layer by dip coating to form a coat, and the resultant coat was dried for 30 minutes at 100° C. to form a charge-transporting layer having a thickness of 18 μm.

<Formation of Protective Layer>

A mixed solvent of 20 parts of 1,1,2,2,3,3,4-heptafluorocyclopentane (product name: ZEORORAH, manufactured by Zeon Corporation) and 20 parts of 1-propanol was filtered with a polyflon filter (product name: PF-040, manufactured by Advantec Toyo Kaisha, Ltd.). After that, 90 parts of a hole-transportable compound represented by the following formula (F):

(F)

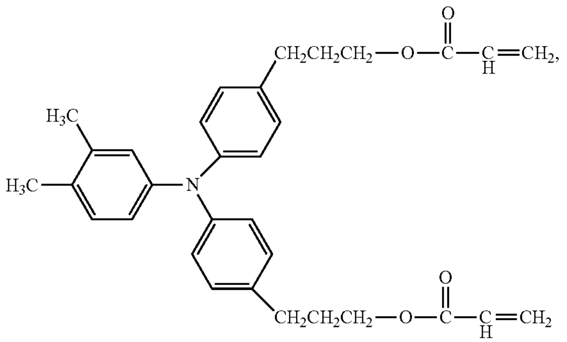

70 parts of 1,1,2,2,3,3,4-heptafluorocyclopentane, and 70 parts of 1-propanol were added to the mixed solvent. The mixture was filtered with a polyflon filter (product name: PF-020, manufactured by Advantec Toyo Kaisha, Ltd.) again to prepare a coating liquid for a protective layer. The coating liquid for a protective layer was applied onto the charge-transporting layer by dip coating, and the resultant coat was dried in the atmosphere for 6 minutes at 50° C. After that, in nitrogen, the coat was irradiated with electron beams for 1.6 seconds under the conditions of an acceleration voltage of 70 kV and an absorbed dose of 8,000 Gy while the support (irradiation target body) was rotated at 200 rpm. Subsequently, the coat was heated by increasing its temperature from 25° C. to 125° C. in nitrogen over 30 seconds. The oxygen concentrations of the atmosphere at the time of the electron beam irradiation and at the time of the heating after the irradiation were each 15 ppm. Next, the coat was subjected to heating treatment in the atmosphere for 30 minutes at 100° C. to form a 5-micrometer thick protective layer cured by the electron beams.

Processing of Surface of Photosensitive Member

The surface of the protective layer was polished with a polishing sheet (product name: GC3000, manufactured by Riken Corundum Co., Ltd.). The feeding speed of the polishing sheet was set to 40 mm/min, the number of revolutions of the product to be processed was set to 240 rpm, and the pressing pressure of the polishing sheet against the protective layer was set to 7.5 $N/m^2$. The feeding direction of the polishing sheet and the rotation direction of the photosensitive member were set to be the same direction. In addition, a backup roller having an outer diameter of 40 cm and an Asker C hardness of 40 was used. A linear groove was formed in the peripheral surface of the protective layer under the foregoing conditions over 10 seconds. Thus, a photosensitive member A-1 was produced.

Production Examples of Photosensitive Member A-2 to Photosensitive Member A-14

Electrophotographic photosensitive members were each produced in exactly the same manner as in the photosensitive member A-1 except that a support shown in Table 2 was used. The resultant electrophotographic photosensitive members are defined as "a photosensitive member A-2 to a photosensitive member A-14."

Production Examples of Photosensitive Member B-1 to Photosensitive Member B-13

Electrophotographic photosensitive members were each produced in exactly the same manner as in the photosensitive member A-1 except that a support shown in Table 2 was used. The resultant electrophotographic photosensitive members are defined as "a photosensitive member B-1 to a photosensitive member B-13."

Production Examples of Photosensitive Member C-1 to Photosensitive Member C-13

Electrophotographic photosensitive members were each produced in exactly the same manner as in the photosensitive member A-1 except that a support shown in Table 2 was used. The resultant electrophotographic photosensitive members are defined as "a photosensitive member C-1 to a photosensitive member C-13."

Production Examples of Photosensitive Member D-1 to Photosensitive Member D-11

Electrophotographic photosensitive members were each produced in exactly the same manner as in the photosensitive member A-1 except that a support shown in Table 2 was used. The resultant electrophotographic photosensitive members are defined as "a photosensitive member D-1 to a photosensitive member D-11."

Evaluation

Example A-1

<Evaluation of Surface Direction Unevenness>

The photosensitive member A-1 was mounted on the cyan station of an electrophotographic apparatus (copying machine) (product name: imagePRESS C910, manufactured by Canon Inc.) serving as an evaluation apparatus.

First, 30,000 sheets of paper were passed under an environment at 27° C. and 60% RH, and then the surface potential of the photosensitive member was measured.

The surface potential of the photosensitive member A-1 was measured as follows: a cartridge for development was removed from the evaluation apparatus; a potential probe (product name: model 6000B-8, manufactured by Trek, Inc.) was set in the position of the cartridge; and the measurement was performed with a surface potentiometer (model 344: manufactured by Trek, Inc.).

First, a dark potential (Vd) at the center in the axial direction of the photosensitive member A-1 was adjusted to −600 V. Next, the light potential (Vl) of the surface of the photosensitive member A-1 was evaluated under a constant condition of the exposure light quantity of an exposing apparatus. The measurement of the light potential was performed for 12 points arranged every 30° in the circumferential direction of the photosensitive member A-1 at each of the center position in the axial direction of the photosensitive member A-1 and positions distant from both the ends of the photosensitive member A-1 by 40 mm each (total: 3 points in the axial direction×12 points in the circumferential direction=36 points). After that, the maximum value and minimum value of the surface potentials at the 12 points in the circumferential direction of the photosensitive member A-1 at each position in the axial direction were calculated. The largest potential difference (V) out of potential differences each calculated from the resultant maximum value and minimum value of the surface potentials at each position in the axial direction was defined as surface direction unevenness, and was evaluated by the following ranks. The result of the evaluation is shown in Table 2.

In the following ranks A to D, the rank A is the most excellent evaluation, and when the photosensitive member is ranked as C or more, the photosensitive member obtains the effect of the present invention. Meanwhile, the rank D is the same level of evaluation of surface direction unevenness as that of a related-art photosensitive member.

Rank A: The surface direction unevenness is less than 10 V.

Rank B: The surface direction unevenness is 10 V or more and less than 15 V.

Rank C: The surface direction unevenness is 15 V or more and less than 20 V.

Rank D: The surface direction unevenness is 20 V or more.

<Evaluation of Short-Term Potential Fluctuation>

The photosensitive member A-1 was prepared separately from the photosensitive member used in the evaluation of surface direction unevenness, and was mounted on the cyan station of an electrophotographic apparatus (copying machine) (product name: imagePRESS C910, manufactured by Canon Inc.) serving as an evaluation apparatus.

The surface potential of the photosensitive member A-1 was measured as follows: a cartridge for development was removed from the evaluation apparatus; a potential probe (product name: model 6000B-8, manufactured by Trek, Inc.) was set in the position of the cartridge; and the measurement was performed with a surface potentiometer (model 344: manufactured by Trek, Inc.).

First, the dark potential (Vd) of the photosensitive member A-1 was adjusted to −600 V. Next, the light potential (Vl) of the surface of the photosensitive member A-1 was evaluated under a constant condition of the exposure light quantity of an exposing apparatus. The measurement of the light potential was performed for 12 points arranged every 30° in the circumferential direction of the photosensitive member A-1 at each of the center position in the axial direction of the photosensitive member A-1 and positions distant from both the ends of the photosensitive member A-1 by 40 mm each (total: 3 points in the axial direction×12 points in the circumferential direction=36 points). After that, the average of the light potentials of the photosensitive member A-1 in the circumferential direction at each position in the axial direction was calculated, and was defined as an initial potential at each position in the axial direction.

Next, the cartridge for development was returned to the original position, and 1,000 sheets of paper were passed under an environment at 27° C. and 60% RH. After that, the potential probe was set in the position of the cartridge again, and the average of the light potentials of the photosensitive member A-1 in the circumferential direction at each position in the axial direction was calculated in the same manner as that described above. The average was defined as a potential after endurance at each position in the axial direction. Finally, the absolute value of a difference between the initial potential and the potential after endurance at each position in the axial direction was calculated. The average of the differences at the respective positions was calculated as a short-term potential fluctuation value, and was evaluated by the following ranks. The result of the evaluation is shown in Table 3.

When the photosensitive member is ranked as A in the following ranks A and B, the photosensitive member obtains the effect of the present invention. Meanwhile, the rank B is the same level of evaluation of a short-term potential fluctuation value as that of the related-art photosensitive member.

Rank A: The short-term potential fluctuation is less than 10 V.

Rank B: The short-term potential fluctuation is 10 V or more.

<Calculation of Area A ($\mu m^2$) at Maximum Frequency, Half-Width B ($\mu m^2$), and Ratio B/A>

Segments each having a size of about 10 mm square were cut out of 4 sites arranged every 90° in the circumferential direction of the photosensitive member A-1 evaluated for its short-term potential fluctuation at each of positions distant from both ends in the axial direction thereof by 40 mm each and the center position in the axial direction of the support thereof (a total of 4×3=12 sites). The protective layer of each of the segments was removed by polishing the segment with a polishing sheet, and then the photosensitive layer thereof was removed with methyl ethyl ketone. After that, the surface of the support was exposed and subjected to mirror finishing by buffing. Next, the segment was treated by being immersed in an aqueous solution of sodium hydroxide for 1 minute to provide a sample for measuring the areas of crystal grains.

A 100-micrometer square region of the surface of the resultant sample was observed by the method described above, and the areas of its crystal grains were calculated. After that, the area distribution of the crystal grains was produced by the method described above, and an area A ($\mu m^2$) at the maximum frequency calculated from the area distribution curve of the crystal grains and the half-width B ($\mu m^2$) of the highest peak in the area distribution curve were calculated, followed by the calculation of the ratio B/A. The results of the evaluation are shown in Table 2.

Examples A-2 to A-14 and Examples B-1 to B-13

In each of Examples A-2 to A-14 and Examples B-1 to B-13, the evaluations of surface direction unevenness and short-term potential fluctuation, and the calculation of an area A ($\mu m^2$) at the maximum frequency calculated from the area distribution curve of crystal grains, the half-width B ($\mu m^2$) of the highest peak in the area distribution curve, and the ratio B/A were performed in the same manner as in Example A-1 except that the photosensitive member A-1 used in Example A-1 was changed to a photosensitive member shown in Table 2.

Comparative Examples C-1 to C-13 and Comparative Examples D-1 to D-11

In each of Comparative Examples C-1 to C-13 and Comparative Examples D-1 to D-11, the evaluation of surface direction unevenness, and the calculation of an area A ($\mu m^2$) at the maximum frequency calculated from the area distribution curve of crystal grains, the half-width B ($\mu m^2$) of the highest peak in the area distribution curve, and the ratio B/A were performed in the same manner as in Example A-1 except that the photosensitive member A-1 used in Example A-1 was changed to a photosensitive member shown in Table 2.

The calculation of the area A ($\mu m^2$) at the maximum frequency calculated from the area distribution of the crystal grains, the half-width B ($\mu m^2$), and the ratio B/A was performed by preparing the photosensitive members C-1 to C-13 and D-1 to D-11 separately from the photosensitive members each used in the evaluation of surface direction unevenness.

TABLE 2

| | | | Crystal | | Evaluation | |
|---|---|---|---|---|---|---|
| | Photosensitive member | Support | B/A | A ($\mu m^2$) | Surface direction unevenness (V) | Rank |
| Example A-1 | Photosensitive member A-1 | Support A-1 | 0.37 | 69 | 8.9 | A |
| Example A-2 | Photosensitive member A-2 | Support A-2 | 0.39 | 60 | 8.5 | A |
| Example A-3 | Photosensitive member A-3 | Support A-3 | 0.40 | 10 | 9.2 | A |
| Example A-4 | Photosensitive member A-4 | Support A-4 | 0.50 | 64 | 9.7 | A |
| Example A-5 | Photosensitive member A-5 | Support A-5 | 0.55 | 58 | 10.6 | B |
| Example A-6 | Photosensitive member A-6 | Support A-6 | 0.56 | 9 | 11.6 | B |
| Example A-7 | Photosensitive member A-7 | Support A-7 | 0.70 | 50 | 14.5 | B |
| Example A-8 | Photosensitive member A-8 | Support A-8 | 0.75 | 40 | 16.3 | C |
| Example A-9 | Photosensitive member A-9 | Support A-9 | 0.78 | 7 | 17.2 | C |

TABLE 2-continued

| | | | Crystal | | Evaluation | |
|---|---|---|---|---|---|---|
| | Photosensitive member | Support | B/A | A ($\mu m^2$) | Surface direction unevenness (V) | Rank |
| Example A-10 | Photosensitive member A-10 | Support A-10 | 0.96 | 49 | 17.8 | C |
| Example A-11 | Photosensitive member A-11 | Support A-11 | 1.00 | 43 | 18.1 | C |
| Example A-12 | Photosensitive member A-12 | Support A-12 | 0.99 | 8 | 18.6 | C |
| Example A-13 | Photosensitive member A-13 | Support A-13 | 0.38 | 69 | 9.6 | A |
| Example A-14 | Photosensitive member A-14 | Support A-14 | 0.37 | 70 | 9.7 | A |
| Example B-1 | Photosensitive member B-1 | Support B-1 | 0.37 | 58 | 8.7 | A |
| Example B-2 | Photosensitive member B-2 | Support B-2 | 0.39 | 50 | 8.6 | A |
| Example B-3 | Photosensitive member B-3 | Support B-3 | 0.40 | 10 | 9.2 | A |
| Example B-4 | Photosensitive member B-4 | Support B-4 | 0.50 | 57 | 9.5 | A |
| Example B-5 | Photosensitive member B-5 | Support B-5 | 0.56 | 49 | 11.2 | B |
| Example B-6 | Photosensitive member B-6 | Support B-6 | 0.56 | 9 | 12.1 | B |
| Example B-7 | Photosensitive member B-7 | Support B-7 | 0.70 | 45 | 13.2 | B |
| Example B-8 | Photosensitive member B-8 | Support B-8 | 0.75 | 39 | 15.6 | C |
| Example B-9 | Photosensitive member B-9 | Support B-9 | 0.78 | 8 | 17.1 | C |
| Example B-10 | Photosensitive member B-10 | Support B-10 | 0.96 | 36 | 17.9 | C |
| Example B-11 | Photosensitive member B-11 | Support B-11 | 1.00 | 32 | 18.6 | C |
| Example B-12 | Photosensitive member B-12 | Support B-12 | 0.99 | 7 | 17.9 | C |
| Example B-13 | Photosensitive member B-13 | Support B-13 | 0.38 | 62 | 9.4 | A |
| Comparative Example C-1 | Photosensitive member C-1 | Support C-1 | 1.06 | 40 | 20.6 | D |
| Comparative Example C-2 | Photosensitive member C-2 | Support C-2 | 1.19 | 2 | 21.0 | D |
| Comparative Example C-3 | Photosensitive member C-3 | Support C-3 | 1.09 | 1 | 20.9 | D |
| Comparative Example C-4 | Photosensitive member C-4 | Support C-4 | 1.33 | 2 | 22.3 | D |
| Comparative Example C-5 | Photosensitive member C-5 | Support C-5 | 1.05 | 2 | 20.5 | D |
| Comparative Example C-6 | Photosensitive member C-6 | Support C-6 | 1.63 | 3 | 24.0 | D |
| Comparative Example C-7 | Photosensitive member C-7 | Support C-7 | 1.71 | 3 | 23.9 | D |
| Comparative Example C-8 | Photosensitive member C-8 | Support C-8 | 1.51 | 1 | 22.9 | D |
| Comparative Example C-9 | Photosensitive member C-9 | Support C-9 | 1.32 | 3 | 23.6 | D |
| Comparative Example C-10 | Photosensitive member C-10 | Support C-10 | 1.39 | 3 | 21.7 | D |
| Comparative Example C-11 | Photosensitive member C-11 | Support C-11 | 1.06 | 1 | 20.8 | D |
| Comparative Example C-12 | Photosensitive member C-12 | Support C-12 | 1.41 | 3 | 22.5 | D |
| Comparative Example C-13 | Photosensitive member C-13 | Support C-13 | 1.38 | 2 | 23.0 | D |
| Comparative Example D-1 | Photosensitive member D-1 | Support D-1 | 1.05 | 36 | 21.5 | D |
| Comparative Example D-2 | Photosensitive member D-2 | Support D-2 | 1.21 | 3 | 22.6 | D |
| Comparative Example D-3 | Photosensitive member D-3 | Support D-3 | 1.05 | 2 | 20.9 | D |
| Comparative Example D-4 | Photosensitive member D-4 | Support D-4 | 1.31 | 1 | 23.2 | D |
| Comparative Example D-5 | Photosensitive member D-5 | Support D-5 | 1.06 | 3 | 20.9 | D |
| Comparative Example D-6 | Photosensitive member D-6 | Support D-6 | 1.65 | 4 | 25.0 | D |
| Comparative Example D-7 | Photosensitive member D-7 | Support D-7 | 1.72 | 2 | 24.6 | D |
| Comparative Example D-8 | Photosensitive member D-8 | Support D-8 | 1.52 | 3 | 23.5 | D |
| Comparative Example D-9 | Photosensitive member D-9 | Support D-9 | 1.29 | 2 | 24.6 | D |
| Comparative Example D-10 | Photosensitive member D-10 | Support D-10 | 1.41 | 3 | 23.8 | D |
| Comparative Example D-11 | Photosensitive member D-11 | Support D-11 | 1.06 | 1 | 21.3 | D |

TABLE 3

| | Evaluation | |
|---|---|---|
| | Short-term potential fluctuation (V) | Rank |
| Example A-1 | 6.0 | A |
| Example A-2 | 7.1 | A |
| Example A-3 | 10.7 | A |
| Example A-4 | 6.5 | A |
| Example A-5 | 6.8 | A |
| Example A-6 | 11.6 | B |
| Example A-7 | 8.2 | A |
| Example A-8 | 7.4 | A |
| Example A-9 | 13.2 | B |
| Example A-10 | 8.2 | A |
| Example A-11 | 7.6 | A |
| Example A-12 | 12.3 | B |
| Example A-13 | 7.8 | A |
| Example A-14 | 9.0 | A |
| Example B-1 | 8.9 | A |
| Example B-2 | 8.4 | A |
| Example B-3 | 10.3 | A |
| Example B-4 | 7.6 | A |
| Example B-5 | 8.1 | A |
| Example B-6 | 12.1 | B |
| Example B-7 | 7.1 | A |
| Example B-8 | 6.9 | A |
| Example B-9 | 12.5 | B |
| Example B-10 | 7.2 | A |
| Example B-11 | 7.1 | A |
| Example B-12 | 11.6 | B |
| Example B-13 | 8.3 | A |

As can be seen from the data shown in Table 2, the photosensitive member of the present invention having a ratio B/A of 1.0 or less exhibits a suppressing effect on the surface direction unevenness of an output image. It is also found that a photosensitive member having a ratio B/A of 0.7 or less, or further, a ratio B/A of 0.5 or less more strongly exhibits a suppressing effect on the surface direction unevenness of an output image.

In addition, as can be seen from the data shown in Table 3, when the average area of the aluminum crystal grains is 10 $\mu m^2$ or more, a reducing effect on the short-term potential fluctuation is exhibited. The effect may result from the fact that when the average area of the aluminum crystal grains is set to 10 $\mu m^2$ or more, the ease with which an electron flows is hardly affected by a grain boundary between the crystal grains, and hence initial charge retention can be suppressed from occurring on the support.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-031219, filed Feb. 26, 2021, which is hereby incorporated by reference herein in its entirety.

What is claimed is:

1. An electrophotographic photosensitive member, comprising:

a support having a cylindrical shape and comprising at least one of aluminum or an aluminum alloy; and a photosensitive layer formed on the support, wherein $B/A \leq 1.0$ when A ($\mu m^2$) is an area at a maximum frequency calculated from an area distribution curve of aluminum crystal grains of a surface of the support and B ($\mu m^2$) is a half-width of a highest peak in the area distribution curve.

2. The electrophotographic photosensitive member according to claim 1, wherein an average area of the aluminum crystal grains calculated from the area distribution curve is at least 10 $\mu m^2$.

3. The electrophotographic photosensitive member according to claim 1, wherein the support satisfies $B/A \leq 0.5$.

4. The electrophotographic photosensitive member according to claim 1, wherein the support is formed of an aluminum alloy containing 0.6 mass % or less of a silicon element, 0.7 mass % or less of an iron element, 0.05 mass % or more and 0.2 mass % or less of a copper element, 1.0 mass % or more and 1.5 mass % or less of a manganese element, and 0.1 mass % or less of a zinc element, and containing aluminum and impurities as a balance.

5. The electrophotographic photosensitive member according to claim 1, wherein the support is formed of an aluminum alloy containing 0.2 mass % or more and 0.6 mass % or less of a silicon element, 0.35 mass % or less of an iron element, 0.1 mass % or less of a copper element, 0.1 mass % or less of a manganese element, 0.45 mass % or more and 0.9 mass % or less of a magnesium element, 0.1 mass % or less of a chromium element, 0.1 mass % or less of a zinc element, and 0.1 mass % or less of a titanium element, and containing aluminum and impurities as a balance.

6. The electrophotographic photosensitive member according to claim 1, wherein the support is formed of an aluminum alloy containing (i) 0.6 mass % or less of a silicon element, 0.7 mass % or less of an iron element, 0.05 mass % or more and 0.2 mass % or less of a copper element, 1.0 mass % or more and 1.5 mass % or less of a manganese element, and 0.1 mass % or less of a zinc element, and containing aluminum and impurities as a balance, or (ii) 0.2 mass % or more and 0.6 mass % or less of a silicon element, 0.35 mass % or less of an iron element, 0.1 mass % or less of a copper element, 0.1 mass % or less of a manganese element, 0.45 mass % or more and 0.9 mass % or less of a magnesium element, 0.1 mass % or less of a chromium element, 0.1 mass % or less of a zinc element, and 0.1 mass % or less of a titanium element, and containing aluminum and impurities as a balance.

7. A process cartridge, comprising:

an electrophotographic photosensitive member; and at least one unit selected from the group consisting of a charging unit, a developing unit and a cleaning unit;

the process cartridge integrally supporting the electrophotographic photosensitive member and the at least one unit, and being removably mounted onto a main body of an electrophotographic apparatus; and the electrophotographic photosensitive member including a support having a cylindrical shape and comprising at least one of aluminum or an aluminum alloy, and having a photosensitive layer formed on the support, wherein $B/A \leq 1.0$ when A ($\mu m^2$) is an area at a maximum frequency calculated from an area distribution curve of aluminum crystal grains of a surface of the support and B ($\mu m^2$) is a half-width of a highest peak in the area distribution curve.

8. An electrophotographic apparatus, comprising:

an electrophotographic photosensitive member;

a charging unit;

an exposing unit;

a developing unit; and a transferring unit;

the electrophotographic photosensitive member including a support having a cylindrical shape and comprising at least one of aluminum or an aluminum alloy, and having a photosensitive layer formed on the support, wherein B/A≤1.0 when A ($\mu m^2$) is an area at a maximum frequency calculated from an area distribution curve of aluminum crystal grains of a surface of the support and B ($\mu m^2$) is a half-width of a highest peak in the area distribution curve.

* * * * *